United States Patent
Xu (10) Patent No.: US 12,495,478 B2
(45) Date of Patent: Dec. 9, 2025

(54) CONTROL METHOD, CONTROL DEVICE AND LIGHTING SYSTEM

(71) Applicants: OPPLE LIGHTING CO., LTD., Shanghai (CN); SUZHOU OPPLE LIGHTING CO., LTD., Suzhou (CN)

(72) Inventor: Bozhong Xu, Shanghai (CN)

(73) Assignees: OPPLE LIGHTING CO., LTD., Shanghai (CN); SUZHOU OPPLE LIGHTING CO., LTD., Suzhou (CN)

(*) Notice: Subject to any disclaimer, the term of this patent is extended or adjusted under 35 U.S.C. 154(b) by 103 days.

(21) Appl. No.: 18/528,782

(22) Filed: Dec. 5, 2023

(65) Prior Publication Data

US 2024/0107647 A1    Mar. 28, 2024

Related U.S. Application Data

(63) Continuation of application No. PCT/CN2022/097435, filed on Jun. 7, 2022.

(51) Int. Cl.
*H05B 47/155* (2020.01)
*H05B 47/165* (2020.01)
*H05B 47/175* (2020.01)

(52) U.S. Cl.
CPC ......... *H05B 47/155* (2020.01); *H05B 47/165* (2020.01); *H05B 47/198* (2024.01)

(58) Field of Classification Search
None
See application file for complete search history.

(56) References Cited

U.S. PATENT DOCUMENTS

| | | | |
|---|---|---|---|
| 2003/0020595 A1 | 1/2003 | Wacyk | |
| 2004/0217718 A1* | 11/2004 | Kumar | H05B 47/195 315/291 |
| 2015/0084547 A1* | 3/2015 | Yeh | H05B 47/19 315/312 |
| 2017/0156195 A1 | 6/2017 | Shepherd | |

FOREIGN PATENT DOCUMENTS

| | | |
|---|---|---|
| CN | 1526262 A | 9/2004 |
| CN | 102625554 A | 8/2012 |
| CN | 102801820 A | 11/2012 |
| CN | 113438781 A | 9/2021 |
| WO | 2013126965 A1 | 9/2013 |

OTHER PUBLICATIONS

International Search Report of PCT/CN2022/097435 dated Aug. 2, 2022 with English translation, (4p).

* cited by examiner

*Primary Examiner* — Kenneth B Wells

(74) *Attorney, Agent, or Firm* — Arch & Lake LLP; Hao Tan; Shen Wang (57) ABSTRACT

The present disclosure discloses a control method, a control device and a lighting system. The method includes: sequentially scanning short addresses of all slave devices accessing the master device; allocating a short address to a slave device that does not have a short address; and reallocating a duplicate short address determined in a process of sequentially scanning the short addresses of all the slave devices accessing the master device.

14 Claims, 7 Drawing Sheets

CONTROL METHOD, CONTROL DEVICE AND LIGHTING SYSTEM

CROSS REFERENCES TO RELATED APPLICATIONS

This application is based upon and claims the priority of PCT patent application No. PCT/CN2022/097435 filed on Jun. 7, 2022 which claims priority to the Chinese patent application No. 202110630929.2 filed on Jun. 7, 2021, the entire contents of which are hereby incorporated by reference herein for all purposes.

TECHNICAL FIELD

The present application relates to the technical field of a smart home, in particular to a control method, a control device and a lighting system.

BACKGROUND

With the continuous progress of science and technology and the gradual improvement of people's living standards, the smart home has become an indispensable part of modern family fashion life.

SUMMARY

The present disclosure provides a control method, a control device and a lighting system.

The present disclosure provides a control method which is applied to a lighting system based on a digital addressable lighting interface. The lighting system may include a master device and a plurality of slave devices connected with the master device.

The control method may include: sequentially scanning short addresses of all slave devices accessing the master device; allocating a short address to a slave device that does not have a short address; and reallocating a duplicate short address determined in a process of sequentially scanning the short addresses of all the slave devices accessing the master device.

Reallocating the duplicate short address determined in the process of sequentially scanning the short addresses of all the slave devices accessing the master device may include: acquiring a random address corresponding to a slave device having the duplicate short address; judging whether the random address exists in a device list; wherein the device list comprises device information of the plurality of slave devices, and the device information comprises configuration information of the plurality of slave devices, the short address and the random address corresponding to the slave device having the duplicate short address; upon determining that the random address does not exist in the device list, modifying the short address of the slave device of which the random address does not exist in the device list as an available short address; acquiring device information of the slave device corresponding to the available short address; and storing the device information in the device list The present disclosure further provides a control device. The control device may include: a short address scanning unit, configured to sequentially scan short addresses of all slave devices accessing a master device; a short address allocation unit, configured to allocate a short address to a slave device that does not have a short address; a duplicate short address allocation unit, configured to reallocate a duplicate short address determined in a process of scanning short addresses of all the slave devices accessing the master device.

The present disclosure further provides a lighting system. The lighting system may include: a master device which may include the control device according to any example of the present disclosure; and a plurality of slave devices that access the master device.

It is to be understood that both the foregoing general description and the following detailed description are exemplary and explanatory only and are not restrictive of the present disclosure.

BRIEF DESCRIPTION OF DRAWINGS

The technical solution and other beneficial effects of the present disclosure are illustrated by describing the examples of the present disclosure with the accompanying drawings.

DETAILED DESCRIPTION

The technical solutions in the example of the present disclosure are described clearly and completely with the accompanying drawings. The described examples are only a part of the examples of the present disclosure, not all of the examples. Based on the examples in the present disclosure, all other examples obtained by those skilled in the art without creative work belong to the scope of protection of the present disclosure.

In the lighting device control system based on a digital addressable lighting interface (DALI for short), if a short address of a slave device newly accessing the system is duplicated with a short address of a slave device already accessing the system, it can lead to the conflict of instruction sending, and then the normal dimming instruction cannot be sent. In the existing art, the master device solves the short address conflict problem by reallocating the short address of each slave device, but this solution will lead to the loss of the configuration information of the original slave devices.

Figure 1:
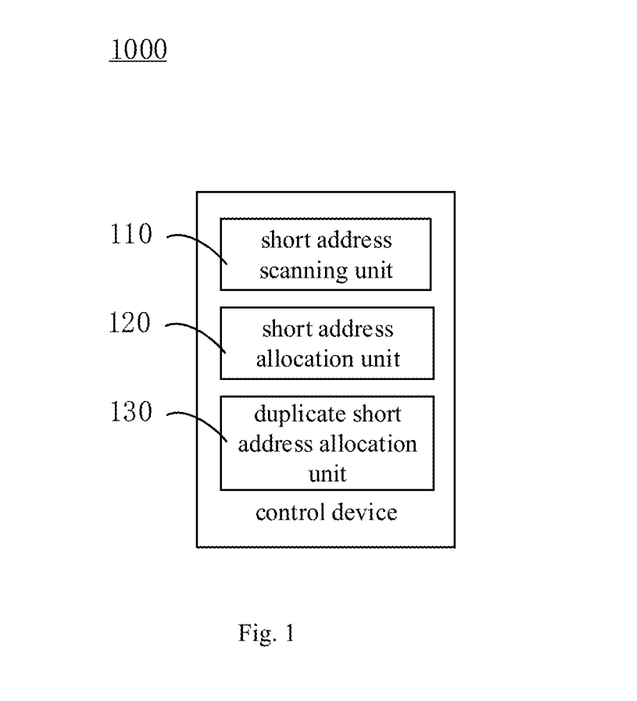
FIG. 1 is a schematic structural diagram of a control device according to an example of the present application.

As illustrated by FIG. 1, an example of the present application provides a control device 1000, wherein the control device 1000 includes a short address scanning unit 110 which is configured to sequentially scan short addresses of all slave devices accessing a master device; a short address allocation unit 120 which is configured to allocate a short address to a slave device that does not have a short address; and a duplicate short address allocation unit 130 which is configured to reallocate a duplicate short address determined in a process of scanning short addresses of all the slave devices accessing the master device.

Figure 2:
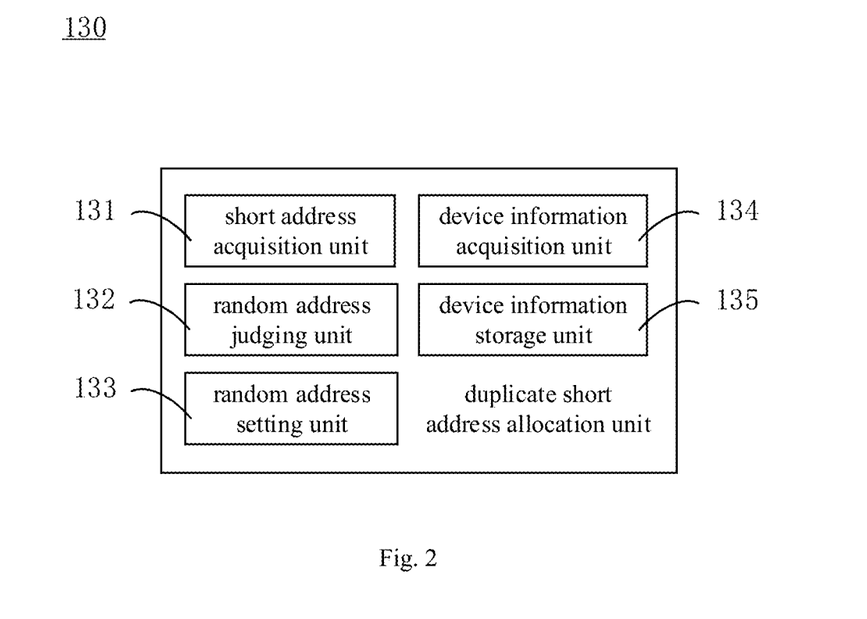
FIG. 2 is a schematic structural diagram of a duplicate short address allocation unit according to an example of the present application.

As illustrated by FIG. 2, the duplicate short address allocation unit 130 includes a short address acquisition unit 131 which is configured to acquire a random address corresponding to a slave device having the duplicate short address; a random address judging unit 132 which is configured to judge whether the random address exists in a device list; a random address setting unit 133 which is configured to modify the short address of the slave device of which the random address does not exist in the device list as an available short address upon determining that the random address does not exist in the device list; a device information acquisition unit 134 which is configured to acquire device information of the slave device having the duplicate short address; and a device information storage unit 135 which is configured to store the device information in the device list; wherein the device list includes the device information of a plurality of slave devices, and the device information includes configuration information of the plurality of slave devices, the short address and the random address corresponding to the slave device having the duplicate short address.

The control device 1000 provided by the example of the present application compares the random address of the slave device as accessed through the device list when the short addresses of the slave devices conflict, and judges whether the slave device is a new device; in the case that the slave device is a new device, the short address of the slave device is reallocated; in the case that the slave device is an old device, the short address and the configuration information of the slave device are not changed, so that the configuration information of the original device is unchanged when the short addresses conflict, and the user does not need to set the configuration information of the slave device again, thereby improving the efficiency of configuring the slave device.

Figure 3:
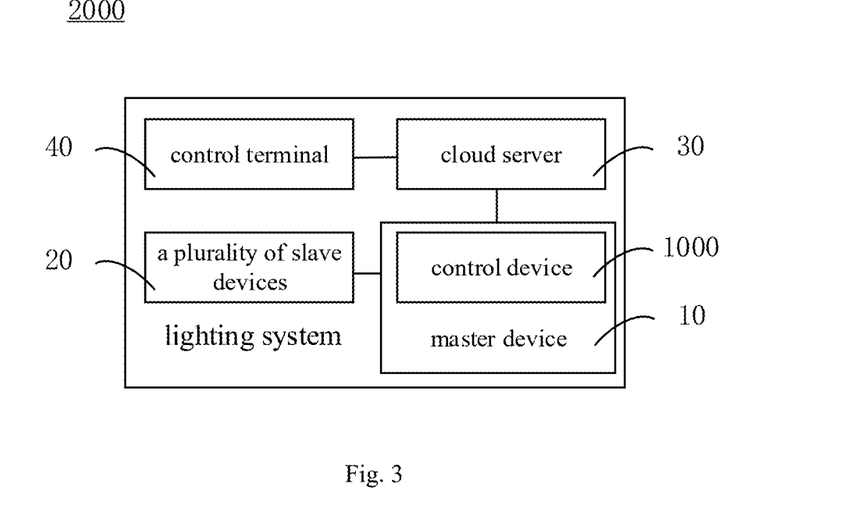
FIG. 3 is a schematic structural diagram of a lighting system according to an example of the present application.

As illustrated by FIG. 3, based on the control device 1000, the present application further provides a lighting system 2000, wherein the lighting system 2000 includes a master device 10 including the control device 1000 according to the example of the present application; and a plurality of slave devices 20, each of the plurality of slave devices 20 accesses the master device 10. In the lighting system based on digital addressable lighting interface (DALI), a number of the slave devices 20 that can access the same master device 10 is in a range from 1 to 64, so the number of the slave devices 20 that can access the master device 10 in the lighting system 2000 of the present application can be 64 at most.

The lighting system 2000 further includes a cloud server 30 connected to the master device 10; and a control terminal 40 connected to the cloud server 30. The control terminal 40 may be a remote controller or a mobile terminal, but it is not limited thereto. The user may send an instruction to the master device or the slave device through the control terminal 40.

The lighting system 2000 provided by the example of the present application compares the random address of the slave device as accessed through the device list when the short addresses of the slave devices conflict, and judges whether the slave device is a new device; in the case that the slave device is the new device, the short address of the slave device is reallocated; in the case that the slave device is an old device, the short address and the configuration information of the slave device are not changed, so that the configuration information of the original device is unchanged when the short addresses conflict, and the user does not need to set the configuration information of the slave device again, thereby improving the efficiency of configuring the slave device.

Figure 4:
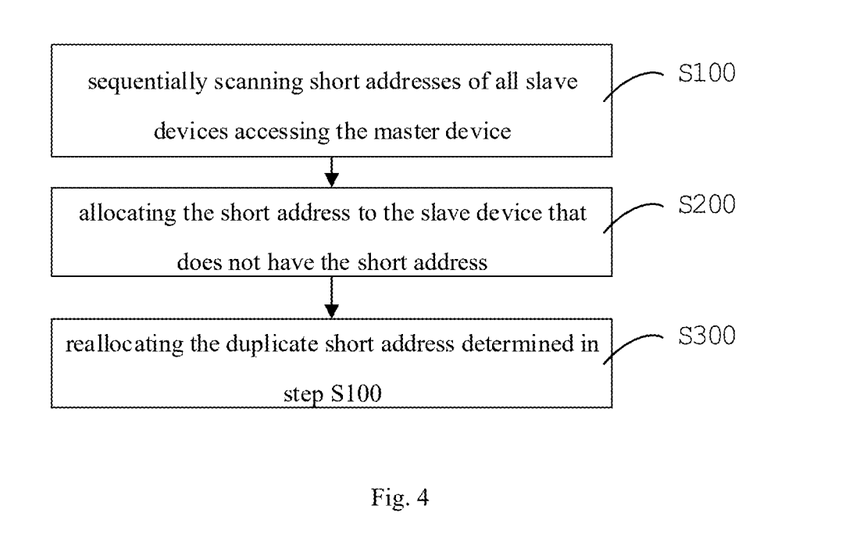
FIG. 4 is a flowchart of a control method according to an example of the present application.

As illustrated by FIG. 4, based on the lighting system 2000, an example of the present application further provides a control method, which comprises the following steps.

Figure 5:
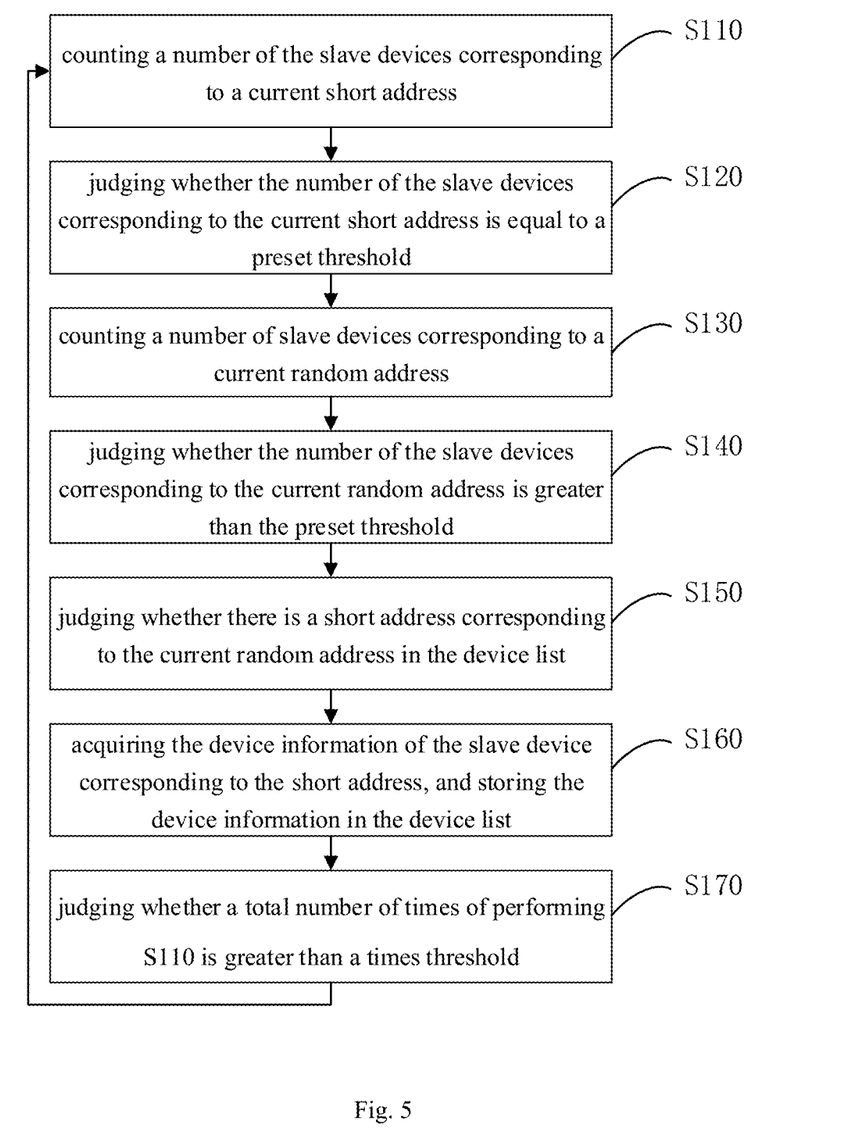
FIG. 5 is a sub-flowchart of a step S100 of sequentially scanning short addresses of all slave devices accessing the master device illustrated by FIG. 4.

Step S100, sequentially scanning short addresses of all slave devices accessing the master device. By scanning the short address of each of the slave devices, the same short address corresponding to multiple slave devices can be marked as a duplicate short address. As illustrated by FIG. 5, this step may include the following steps.

Step S110, counting a number of slave devices corresponding to a current short address.

Figure 6:
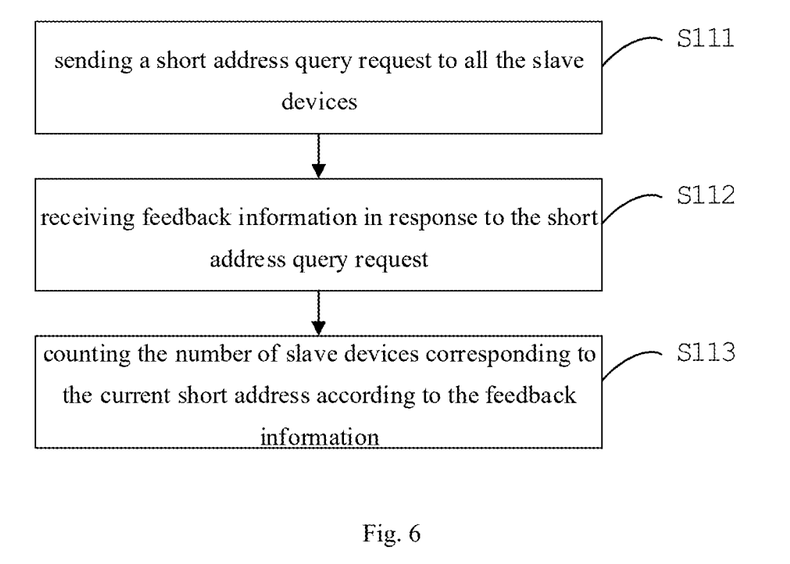
FIG. 6 is a sub-flowchart of a step S100 of counting a number of the slave devices corresponding to a current short address illustrated by FIG. 5.

Referring to FIG. 6, this step includes: step S111, sending a short address query request to all the slave devices; step S112, receiving feedback information in response to the short address query request; step S113, counting the number of slave devices corresponding to the current short address according to the feedback information. Specifically, the master device sends a "QUERY CONTROL GEAR PERSENT" instruction to each slave device, and calculates the number of the slave devices corresponding to the current short address according to a number of the slave devices responding to the instruction.

With continued reference to FIG. 5, step S120, judging whether the number of the slave devices corresponding to the current short address is equal to a preset threshold. In this example, the preset threshold is 1. In a DALI system that can work correctly, one short address should only correspond to one slave device, so the preset threshold of 1 indicates that the lighting system based on DALI works normally. Upon determining that the number of the slave devices corresponding to the current short address is greater than the preset threshold, marking the current short address as a duplicate short address in the device list, and continuing to perform the step of counting the number of the slave devices corresponding to the current short address.

Step S130, upon determining that the number of the slave devices corresponding to the current short address is equal to the preset threshold, counting a number of slave devices corresponding to a current random address, the current random address is a random address of the slave device corresponding to the current short address.

Step S140, judging whether the number of the slave devices corresponding to the current random address is greater than the preset threshold.

Step S150, upon determining that the number of the slave devices corresponding to the current random address is less than or equal to the preset threshold, judging whether there is a short address corresponding to the current random address in the device list. Upon determining that the number of the slave devices corresponding to the current random address is greater than the preset threshold, marking the current short address as a duplicate short address in the device list.

By performing the above steps S110 to S130, it can be confirmed that the current short address is not the duplicate short address. However, in the case that the same random address corresponds to multiple short address, a subsequent step of determining the minimum random address can be abnormal. Therefore, in the case that there is the duplicate random address, it is needed to mark the short address as the duplicate short address and regenerate a random address of the slave device corresponding to the current random address in a subsequent step.

Step S160, upon determining that the short address corresponding to the current random address does not exist in the device list, acquiring the device information of the slave device corresponding to the short address, and storing the device information in the device list.

Step S170, judging whether a total number of times of performing the step of counting the number of the slave devices corresponding to the current short address is greater than a times threshold; if not, continuing to perform the step of counting the number of the slave devices corresponding to the current short address.

Because the number of the slave devices access the same master device is at most 64, the step of counting the number of the slave devices corresponding to the current short address can be performed at most 64 times. In other words, when the number of the slave devices is 64, each slave device is added to the device list after 64 scans.

Figure 7:
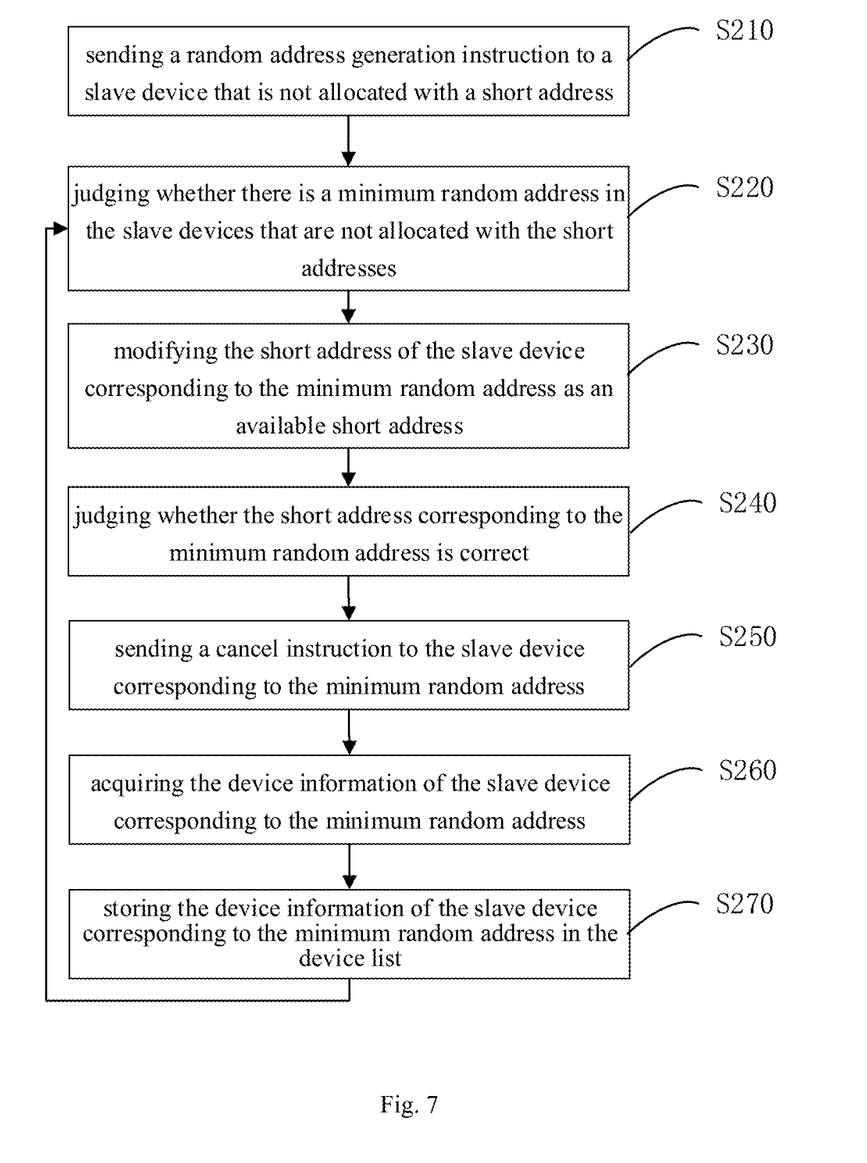
FIG. 7 is a sub-flowchart of a step S200 of allocating the short address to the slave device that does not have the short address illustrated by FIG. 4.

With continued reference to FIG. 4, step S200, allocating the short address to the slave device that does not have the short address. In this step, it can be ensured that each slave device is allocated one available short address. As illustrated by FIG. 7, this step includes steps S210 to S270.

Step S210, sending a random address generation instruction to a slave device that is not allocated with a short address, so that the slave device that is not allocated with the short address generates a random address. Specifically, by sending an "INITIALISE(0xFF)" (initialization) instruction, starting an allocation algorithm for the slave device that has not been allocated with the short address. Sending a "RANDOMISE" (generating a random number) instruction to the slave device, and the slave device can generate one random address in a range of 0 to $2^{24}-2$.

Step S220, judging whether there is a minimum random address in the slave devices that are not allocated with the short addresses. The minimum random address can be determined by a binary search method. Specifically, the slave device having the minimum random address is determined by using "SEARCHADDRH(data)" (host data high byte), "SEARCHADDRM(data)" (host data middle byte), "SEARCHADDRL(data)" (host data low byte) and "COMPARE" (comparing the host data with the random number) instructions and a binary search method. In this way, the minimum random address can be determined quickly, thus improving the efficiency of judging operation.

Step S230, upon determining that there is one minimum random address in the slave devices that are not allocated with the short addresses, modifying the short address of the slave device corresponding to the minimum random address as an available short address. Specifically, the short address is set for the slave device corresponding to the minimum random address by the "PROGRAM SHORT ADDRESS (data)" instruction. Upon determining that the minimum random address does not exist in the slave devices that are not allocated with the short addresses, it represents that each slave device corresponds to one random address.

Step S240, judging whether the short address corresponding to the minimum random address is correct. Specifically, verifying whether the short address of the slave device corresponding to the minimum random address is set correctly through the "VERIFY SHORT ADDRESS(data)" (verifying address) instruction, and the short address of the slave device corresponding to the minimum random address is identified by the "RECAL MAX LEVEL" (recalculating high level) and "RECAL MIN LEVEL" (recalculating low level) instructions.

Step S250, upon determining that the short address corresponding to the minimum random address is correct, sending a cancel instruction to the slave device corresponding to the minimum random address. Specifically, the slave device corresponding to the minimum random address is removed from the slave devices which do not have the short address and the short addresses are allocated to in step S200 by the "WITHDRAW" (withdrawing comparison) instruction.

Step S260, acquiring the device information of the slave device corresponding to the minimum random address.

Step S270, storing the device information of the slave device corresponding to the minimum random address in the device list. Continuing to perform judging whether there is the minimum random address in the slave devices that are not allocated with the short addresses.

With reference to FIG. 4, after the short addresses are allocated to the slave devices that do not have the short addresses in step S200, step S300 is automatically executed: reallocating the duplicate short address determined in the process of sequentially scanning the short addresses of all the slave devices accessing the master device 10 in step S100. Specifically, exiting the execution of step S200 by the "TERMINATE" (terminating program) instruction.

Figure 8:
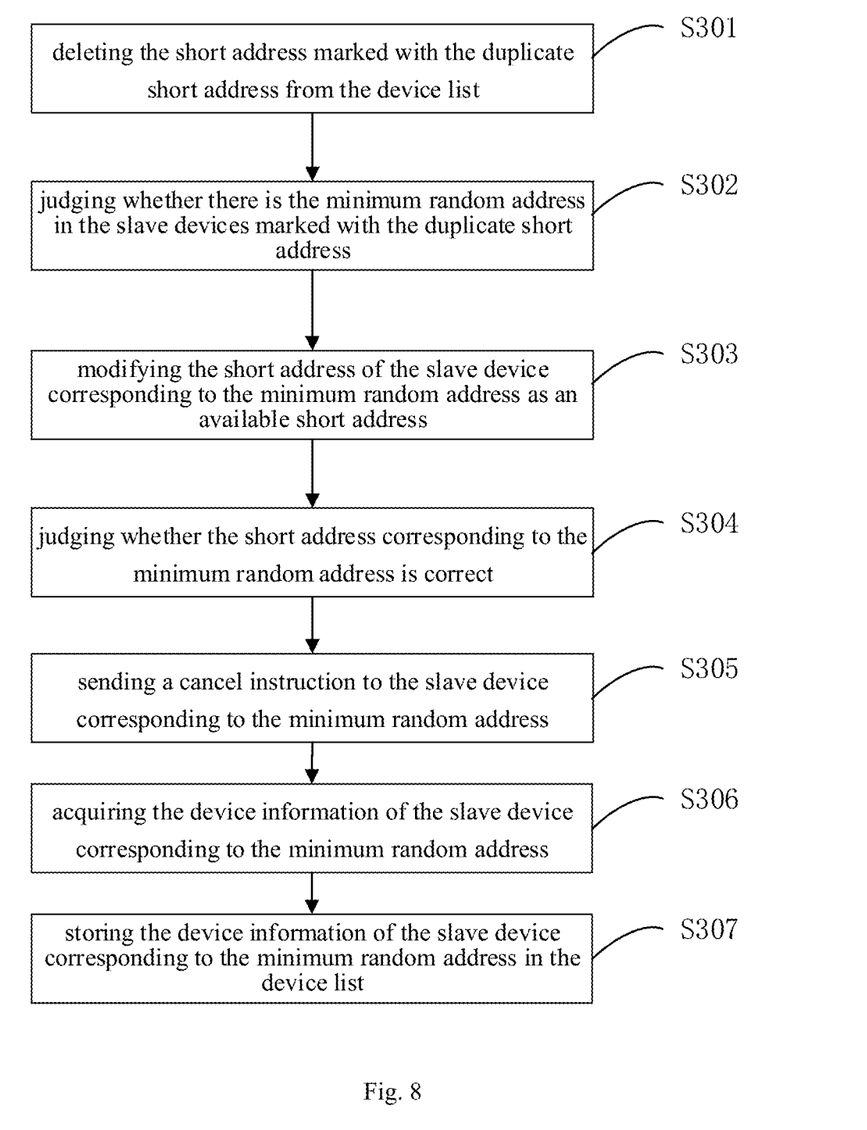
FIG. 8 is a sub-flowchart of a step S300 of reallocating the duplicate short address determined in a step S100 illustrated by FIG. 4.
Figure 9:
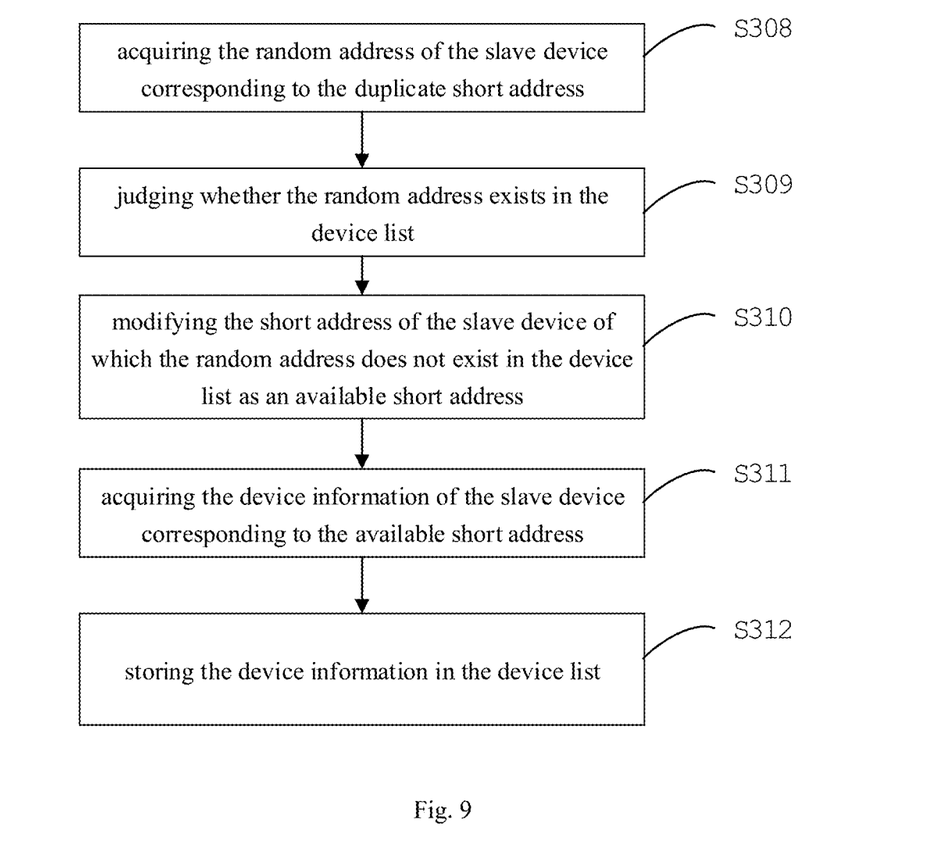
FIG. 9 is another sub-flowchart of a step S300 of reallocating the duplicate short address determined in a step S100 illustrated by FIG. 4.

Step S300, reallocating the duplicate short address determined in the process of sequentially scanning the short addresses of all the slave devices accessing the master device in step S100. The conflict in short address is solved by resetting the short address for the slave device having the duplicate short address. As illustrated by FIGS. 8 and 9, this step specifically includes steps S301 to S313.

Step S301, deleting the short address marked with the duplicate short address from the device list. Specifically, the short address is cleared by sending a "SET SHORT ADDRESS(0xFF)" instruction to the slave devices marked with the duplicate short address, so that the slave device remains in an unallocated short address state.

Step S302, judging whether there is the minimum random address in the slave devices marked with the duplicate short address. Specifically, searching the slave device with the minimum random address by using "SEARCHADDRH (data)", "SEARCHADDRM(data)", "SEARCHADDRL (data)" and "COMPARE" instructions and a binary search method.

Step S303, upon determining that there is one minimum random address in the slave devices marked with the duplicate short address, modifying the short address of the slave device corresponding to the minimum random address as an available short address. Upon determining that there is not one minimum random address in the slave devices marked with the duplicate short address, stopping executing step S300 to reallocate the duplicate short address determined in the process of step S100.

Step S304, judging whether the short address corresponding to the minimum random address is correct. Specifically, verifying whether the short address of the slave device corresponding to the minimum random address is set correctly through the "VERIFY SHORT ADDRESS(data)" instruction, and the short address of the slave device corresponding to the minimum random address is identified by the "RECAL MAX LEVEL" and "RECAL MIN LEVEL" instructions.

Step S305, upon determining that the short address corresponding to the minimum random address is correct, sending a cancel instruction to the slave device corresponding to the minimum random address. Specifically, the slave device corresponding to the minimum random address is removed from the duplicate short address reallocated in step S300 determined in the process of sequentially scanning the short addresses of all the slave devices accessing the master device in step S100 through the "WITHDRAW" instruction.

Step S306, acquiring the device information of the slave device corresponding to the minimum random address.

Step S307, storing the device information of the slave device corresponding to the minimum random address in the device list.

Step S308, acquiring the random address of the slave device corresponding to the duplicate short address.

Step S309, judging whether the random address exists in the device list. The device list includes device information of the plurality of slave devices, and the device information includes configuration information of the slave device, the short address and the random address corresponding to the slave device having the duplicate short address.

Step S310, upon determining that the random address does not exist in the device list, modifying the short address of the slave device of which the random address does not exist in the device list as an available short address. Upon determining that the random address exists in the device list, maintaining the corresponding short address of the slave device having the duplicate short address. As in the existing art, the master device may perform short address reallocation operation on all devices marked with the duplicate short address, that is to say, treat a new device and an old device as the new devices, and reset the configuration information of the devices. However, in the example of the present application, whether the random address is the same as the random address of the old device is judged by reading the unique random address corresponding to the slave device, so as to ensure that the configuration information, the short address, the random address and other parameters of the old device are not different from the configuration information, the short address, the random address and other parameters of the old device before the new device is accessed, thus improving the efficiency of setting the configuration information of the slave device.

Step S311, acquiring the device information of the slave device corresponding to the available short address.

Step S312, storing the device information in the device list. Continuing to preform step S302 of judging whether there is the minimum random address in the slave devices marked with the duplicate short address.

The control method provided by the example of the present application compares the random addresses of the slave devices as accessed through the device list when the short addresses of the slave devices conflict, and judges whether the slave device is a new device; upon judging that the slave device is the new device, the short address of the slave device is reallocated; upon judging that the slave device is an old device, the short address and the configuration information of the slave device are not changed, so that the configuration information of the original device is unchanged when the short addresses conflict, and the user does not need to set the configuration information of the slave device again, thereby improving the efficiency of configuring the slave device.

The present disclosure provides a control method, a control device and a lighting system, so as to solve the problem that configuration information is reset when a master device reallocates the short address of a slave device.

In order to achieve the abovementioned purposes, the present disclosure provides a control method which is applied to a lighting system based on a digital addressable lighting interface, wherein the lighting system comprises a master device and a plurality of slave devices connected with the master device, wherein the control method comprises: sequentially scanning short addresses of all slave devices accessing the master device; allocating a short address to a slave device that does not have a short address; and reallocating a duplicate short address determined in a process of sequentially scanning the short addresses of all the slave devices accessing the master device.

Reallocating the duplicate short address determined in the process of sequentially scanning the short addresses of all the slave devices accessing the master device may include: acquiring a random address corresponding to a slave device having the duplicate short address; judging whether the random address exists in a device list; wherein the device list comprises device information of the plurality of slave devices, and the device information comprises configuration information of the plurality of slave devices, the short address and the random address corresponding to the slave device having the duplicate short address; upon determining that the random address does not exist in the device list, modifying the short address of the slave device of which the random address does not exist in the device list as an available short address; acquiring device information of the slave device corresponding to the available short address; and storing the device information in the device list Furthermore, judging whether the random address exists in the device list further comprises: upon determining that the random address exists in the device list, maintaining the short address corresponding to the slave device having the duplicate short address.

Furthermore, sequentially scanning short addresses of all the slave devices accessing the master device further comprises: counting a number of slave devices corresponding to a current short address; judging whether the number of the slave devices corresponding to the current short address is equal to a preset threshold; upon determining that the number of the slave devices corresponding to the current short address is equal to the preset threshold, counting a number of slave devices corresponding to a current random address, wherein the current random address is a random address of the slave device corresponding to the current short address; judging whether the number of the slave devices corresponding to the current random address is greater than the preset threshold; upon determining that the number of the slave devices corresponding to the current random address is less than or equal to the preset threshold, judging whether there is a short address corresponding to the current random address in the device list; upon determining that the short address corresponding to the current random address does not exist in the device list, acquiring the device information of the slave device corresponding to the short address, and storing the device information in the device list.

Furthermore, counting the number of the slave devices corresponding to the current short address further comprises: sending a short address query request to all the slave devices; receiving feedback information in response to the short address query request; counting the number of the slave devices corresponding to the current short address according to the feedback information.

Furthermore, in a process of judging whether the number of the slave devices corresponding to the current short address is equal to the preset threshold, upon determining that the number of the slave devices corresponding to the current short address is greater than the preset threshold, marking the current short address as a duplicate short address.

Furthermore, in a process of judging whether the number of the slave devices corresponding to the current random short address is equal to the preset threshold, upon determining that the number of the slave devices corresponding to the current random address is greater than the preset threshold, marking the current short address as a duplicate short address.

Furthermore, sequentially scanning short addresses of all the slave devices accessing the master device further comprises: judging whether a total number of times of performing counting the number of the slave devices corresponding to the current short address is greater than a times threshold; if not, continuing to perform counting the number of the slave devices corresponding to the current short address.

Furthermore, allocating the short address to the slave device that does not have the short address comprises: sending a random address generation instruction to a slave device that is not allocated with a short address, so that the slave device that is not allocated with the short address generates a random address; judging whether there is a minimum random address in slave devices that are not allocated with short addresses; upon determining that there is one minimum random address in the slave devices that are not allocated with the short addresses, modifying the short address of the slave device corresponding to the minimum random address as an available short address; judging whether the short address corresponding to the minimum random address is correct; upon determining that the short address corresponding to the minimum random address is correct, sending a cancel instruction to the slave device corresponding to the minimum random address; acquiring the device information of the slave device corresponding to the minimum random address; and storing the device information of the slave device corresponding to the minimum random address in the device list.

Furthermore, allocating the short address to the slave device that does not have the short address further comprises: continuing to perform judging whether there is the minimum random address in the slave devices that are not allocated with the short addresses.

Furthermore, in a process of judging whether there is the minimum random address in the slave devices that are not allocated with the short addresses, the minimum random address is determined by a binary search method.

Furthermore, in a process of reallocating the duplicate short address determined in the process of scanning the short addresses of all the slave devices accessing the master device, before acquiring the random address corresponding to the slave device having the duplicate short address, comprising: deleting the short address marked with the duplicate short address from the device list; judging whether there is the minimum random address in the slave devices marked with the duplicate short address; upon determining that there is one minimum random address in the slave devices marked with the duplicate short address, modifying the short address of the slave device corresponding to the minimum random address as an available short address; judging whether the short address corresponding to the minimum random address is correct; upon determining that the short address corresponding to the minimum random address is correct, sending a cancel instruction to the slave device corresponding to the minimum random address; acquiring the device information of the slave device corresponding to the minimum random address; and storing the device information of the slave device corresponding to the minimum random address in the device list.

Furthermore, acquiring the device information of the slave device corresponding to the minimum random address further comprises: continuing to perform judging whether there is the minimum random address in the slave devices marked with the duplicate short address.

The present disclosure further provides a control device, comprising: a short address scanning unit, configured to sequentially scan short addresses of all slave devices accessing a master device; a short address allocation unit, configured to allocate a short address to a slave device that does not have a short address; a duplicate short address allocation unit, configured to reallocate a duplicate short address determined in a process of scanning short addresses of all the slave devices accessing the master device.

Furthermore, the duplicate short address allocation unit comprises: a short address acquisition unit, configured to acquire a random address corresponding to a slave device having the duplicate short address; a random address judging unit, configured to judge whether the random address exists in a device list; a random address setting unit, configured to modify the short address of the slave device of which random address does not exist in the device list as an available short address upon determining that the random address does not exist in the device list; a device information acquisition unit, configured to acquire device information of the slave device having the duplicate short address; a device information storage unit, configured to storing the device information in the device list; wherein the device list comprises the device information of a plurality of slave devices, and the device information comprises configuration information of the plurality of slave devices, the short address and the random address corresponding to the slave device having the duplicate short address.

The present disclosure further provides a lighting system, comprising: a master device, comprising the control device according to any example of the present disclosure; and a plurality of slave devices, accessing the master device.

Furthermore, the lighting system also comprises a cloud server connected to the master device; and a control terminal connected to the cloud server.

In the examples of the present disclosure, the control method compares the random addresses of the slave devices as accessed through the device list when the short addresses of the slave devices conflict, and judges whether the slave device is a new device; upon judging that the slave device is the new device, the short address of the slave device is reallocated; upon judging that the slave device is an old device, the short address and the configuration information of the slave device are not changed, so that the configuration information of the original device is unchanged when the short addresses conflict, and the user does not need to set the configuration information of the slave device again, thereby improving the efficiency of configuring the slave device. This is also the case with the control method of the present disclosure.

A control method, a control device and a lighting system provided by examples of the present disclosure are described in detail above. In this paper, the principles and implementation of the present disclosure are expounded by using examples.

The present disclosure may include dedicated hardware implementations such as application specific integrated circuits, programmable logic arrays and other hardware devices. The hardware implementations can be constructed to implement one or more of the methods described herein.

Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module referred to herein may include one or more circuits with or without stored code or instructions. The module or circuit may include one or more components that are connected.

The description of the above examples is only used to help understand the method and the core idea of the present disclosure. At the same time, for those skilled in the art, according to the idea of the invention, there may be changes in the specific implementation and application scope. To sum up, the contents of this description should not be understood as limiting the present disclosure.

The invention claimed is:

1. A control method, applied to a lighting system based on a digital addressable lighting interface, wherein the lighting system comprises a master device and a plurality of slave devices connected with the master device, the control method comprising:
   sequentially scanning short addresses of all slave devices accessing the master device;
   allocating a short address to a slave device that does not have a short address; and
   reallocating a duplicate short address determined in a process of sequentially scanning the short addresses of all the slave devices accessing the master device, wherein reallocating the duplicate short address determined in the process of sequentially scanning the short addresses of all the slave devices accessing the master device comprises:
   acquiring a random address corresponding to a slave device having the duplicate short address;
   judging whether the random address exists in a device list;
   wherein the device list comprises device information of the plurality of slave devices, and the device information comprises configuration information of the plurality of slave devices, the short address and the random address corresponding to the slave device having the duplicate short address;
   upon determining that the random address does not exist in the device list, modifying the short address of the slave device of which the random address does not exist in the device list as an available short address;
   acquiring device information of the slave device corresponding to the available short address; and
   storing the device information in the device list.

2. The control method according to claim 1, wherein judging whether the random A address exists in the device list comprises:
   upon determining that the random address exists in the device list, maintaining the short address corresponding to the slave device having the duplicate short address.

3. The control method according to claim 1, wherein sequentially scanning short A addresses of all the slave devices accessing the master device comprises:
   counting a number of slave devices corresponding to a current short address;
   judging whether the number of the slave devices corresponding to the current short address is equal to a preset threshold;
   upon determining that the number of the slave devices corresponding to the current short address is equal to the preset threshold, counting a number of slave devices corresponding to a current random address, wherein the current random address is a random address of the slave device corresponding to the current short address;
   judging whether the number of the slave devices corresponding to the current random address is greater than the preset threshold;
   upon determining that the number of the slave devices corresponding to the current random address is less than or equal to the preset threshold, judging whether there is a short address corresponding to the current random address in the device list; and
   upon determining that the short address corresponding to the current random address does not exist in the device list, acquiring the device information of the slave device corresponding to the short address, and storing the device information in the device list.

4. The control method according to claim 3, wherein counting the number of the slave devices corresponding to the current short address comprises:
   sending a short address query request to all the slave devices;
   receiving feedback information in response to the short address query request; and
   counting the number of the slave devices corresponding to the current short address according to the feedback information.

5. The control method according to claim 3, wherein, in a process of judging whether the number of the slave devices corresponding to the current short address is equal to the preset threshold, upon determining that the number of the slave devices corresponding to the current short address is greater than the preset threshold, marking the current short address as a duplicate short address.

6. The control method according to claim 3, wherein in a process of judging whether the number of the slave devices corresponding to the current random short address is equal to the preset threshold, upon determining that the number of the slave devices corresponding to the current random address is greater than the preset threshold, marking the current short address as a duplicate short address.

7. The control method according to claim 3, wherein sequentially scanning short addresses of all the slave devices accessing the master device further comprises:
   judging whether a total number of times of performing counting the number of the slave devices corresponding to the current short address is greater than a times threshold; if not, continuing to perform counting the number of the slave devices corresponding to the current short address.

8. The control method according to claim 1, wherein allocating the short address to the slave device that does not have the short address comprises:
   sending a random address generation instruction to a slave device that is not allocated with a short address, so that the slave device that is not allocated with the short address generates a random address;

judging whether there is a minimum random address in slave devices that are not allocated with short addresses;
upon determining that there is one minimum random address in the slave devices that are not allocated with the short addresses, modifying the short address of the slave device corresponding to the minimum random address as an available short address;
judging whether the short address corresponding to the minimum random address is correct;
upon determining that the short address corresponding to the minimum random address is correct, sending a cancel instruction to the slave device corresponding to the minimum random address;
acquiring the device information of the slave device corresponding to the minimum random address; and
storing the device information of the slave device corresponding to the minimum random address in the device list.

9. The control method according to claim 8, wherein allocating the short address to the slave device that does not have the short address further comprises:
continuing to perform judging whether there is the minimum random address in the slave devices that are not allocated with the short addresses.

10. The control method according to claim 8, wherein, in a process of judging whether there is the minimum random address in the slave devices that are not allocated with the short addresses, the minimum random address is determined by a binary search method.

11. The control method according to claim 1, in a process of reallocating the duplicate short address determined in the process of scanning the short addresses of all the slave devices accessing the master device, before acquiring the random address corresponding to the slave device having the duplicate short address, further comprising:
deleting the short address marked with the duplicate short address from the device list;
judging whether there is the minimum random address in the slave devices marked with the duplicate short address;
upon determining that there is one minimum random address in the slave devices marked with the duplicate short address, modifying the short address of the slave device corresponding to the minimum random address as an available short address;
judging whether the short address corresponding to the minimum random address is correct;
upon determining that the short address corresponding to the minimum random address is correct, sending a cancel instruction to the slave device corresponding to the minimum random address;
acquiring the device information of the slave device corresponding to the minimum random address; and
storing the device information of the slave device corresponding to the minimum random address in the device list.

12. The control method according to claim 11, wherein acquiring the device information of the slave device corresponding to the minimum random address comprises:
continuing to perform judging whether there is the minimum random address in the slave devices marked with the duplicate short address.

13. A control device, comprising:
a short address scanning unit, configured to sequentially scan short addresses of a plurality of slave devices accessing a master device;
a short address allocation unit, configured to allocate a short address to a slave device that does not have a short address; and
a duplicate short address allocation unit, configured to reallocate a duplicate short address determined in a process of scanning short addresses of all the slave devices accessing the master device;
wherein the duplicate short address allocation unit comprises:
a short address acquisition unit, configured to acquire a random address corresponding to a slave device having the duplicate short address;
a random address judging unit, configured to judge whether the random address exists in a device list;
a random address setting unit, configured to modify the short address of the slave device of which random address does not exist in the device list as an available short address upon determining that the random address does not exist in the device list;
a device information acquisition unit, configured to acquire device information of the slave device having the duplicate short address; and
a device information storage unit, configured to store the device information in the device list: wherein the device list comprises the device information of the plurality of slave devices, and the device information comprises configuration information of the plurality of slave devices, the short address and the random address corresponding to the slave device having the duplicate short address.

14. A lighting system, comprising:
a master device and a plurality of slave devices accessing the master device, wherein the master device comprises a control the control device comprising:
a short address scanning unit, configured to sequentially scan short addresses of the plurality of slave devices accessing the master device;
a short address allocation unit, configured to allocate a short address to a slave device that does not have a short address; and
a duplicate short address allocation unit, configured to reallocate a duplicate short address determined in a process of scanning short addresses of the plurality of slave devices accessing the master device,
wherein the duplicate short address allocation unit comprises:
a short address acquisition unit, configured to acquire a random address corresponding to a slave device having the duplicate short address;
a random address judging unit, configured to judge whether the random address exists in a device list;
a random address setting unit, configured to modify the short address of the slave device of which random address does not exist in the device list as an available short address upon determining that the random address does not exist in the device list;
a device information acquisition unit, configured to acquire device information of the slave device having the duplicate short address; and
a device information storage unit, configured to store the device information in the device list: wherein the device list comprises the device information of the plurality of slave devices, and the device information comprises configuration information of the plurality of slave devices, the short address and the random address corresponding to the slave device having the duplicate short address.

* * * * *